June 13, 1972  F. CAVALLI ET AL  3,669,588

APPARATUS FOR MANUFACTURING CONSTRUCTION ELEMENTS

Filed May 19, 1969  4 Sheets-Sheet 1

INVENTORS

FERNANDO CAVALLI
PIERO CRETTI

BY  *Young & Thompson*

ATTORNEYS

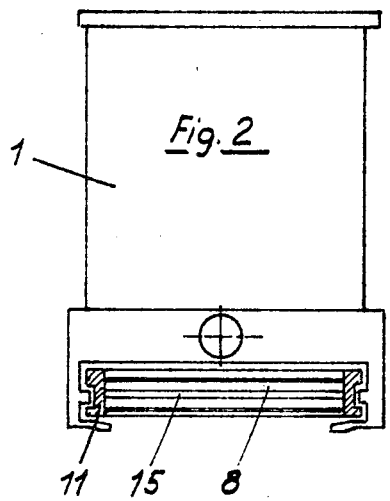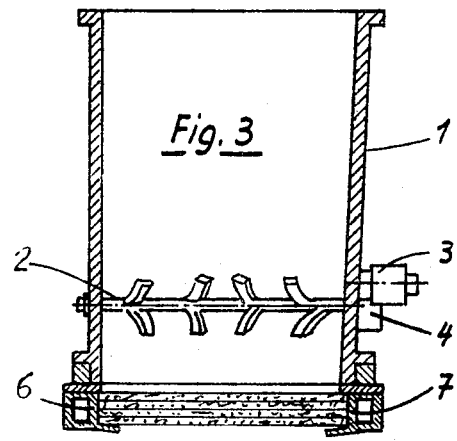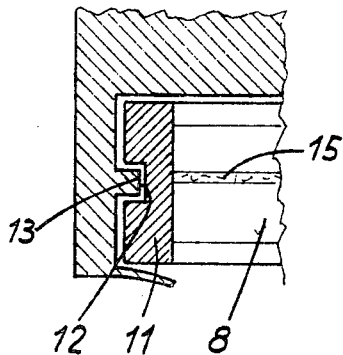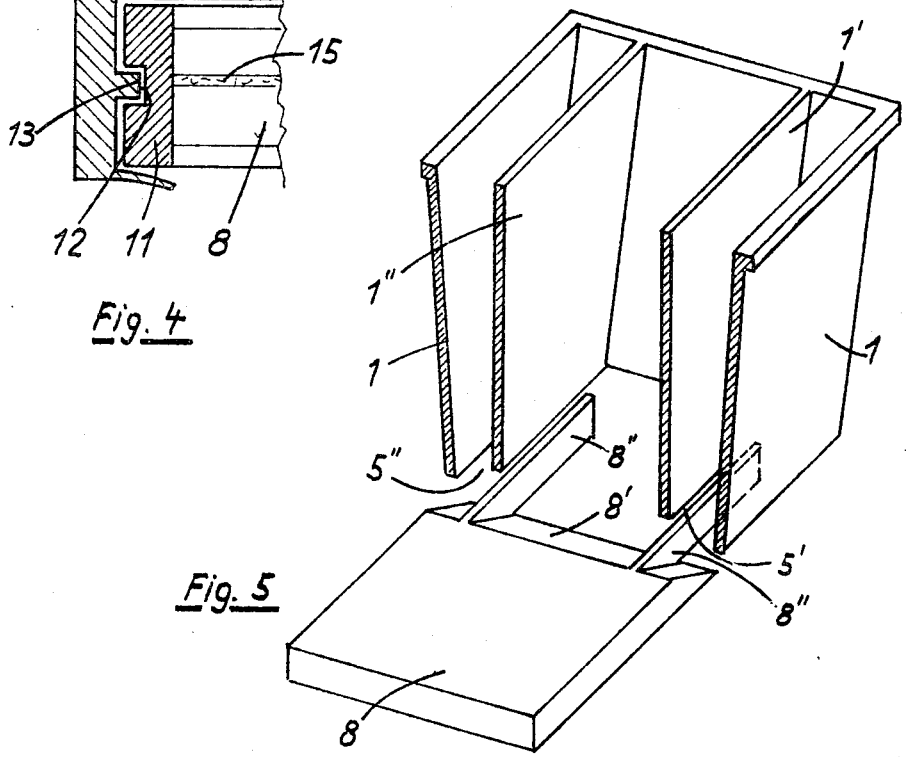

United States Patent Office 3,669,588
Patented June 13, 1972

3,669,588
APPARATUS FOR MANUFACTURING
CONSTRUCTION ELEMENTS
Fernando Cavalli, Morbio Superiore, and Piero Cretti,
Vacallo, Switzerland, assignors to Eros Camponovo,
Chiasso, Switzerland
Filed May 19, 1969, Ser. No. 825,744
Claims priority, application Italy, May 20, 1968,
16,711/68; Jan. 15, 1969, 11,546/69
Int. Cl. B29b 7/22
U.S. Cl. 425—113                                    3 Claims

ABSTRACT OF THE DISCLOSURE

Apparatus for manufacturing construction elements in the form of plates or panels or the like, utilizing cement conglomerate and granules of inert material, comprises a frame carrying a hopper and a reciprocating plunger for compressing material that emerges downwardly from the hopper. The plunger has a downwardly forwardly inclined leading edge, and the resistance of the compressed material to the plunger forces the whole machine rearwardly over its supporting surface instead of forcing the compressed material forwardly. Reinforcing elements can be introduced into the material through a slot in the plunger.

---

The present invention relates to apparatus for rapidly and automatically manufacturing construction elements in the form of plates, panels, reinforced or non reinforced profile elements of any length utilizing cement conglomerates and granules of inert material such as any expanded resin, expanded clay or granular non expanded material.

According to the present invention the cement conglomerate used for manufacturing the above mentioned elements may consist of a mixture of cement and granules of expanded polystyrene having a relatively small diameter which may vary, according to requirements, from 0.5 to 3 mm.

The following composition may be considered very suitable for the manufacturing of construction elements according to the method of the invention:

cement: from 300 to 600 kg.
granules of blown polystyrene: 1 m.
    (diameter from 0.5 to 3 mm.)
water: from 60 to 160 kg.
other inert materials: (sand or gravel) from 50 to 600 kg.

Said granules will preferably not be covered with any adhesive substance which is ordinarily provided for having a first layer of powder cement stick on said granules. However the present invention could be used as well in connection with said conventional types of conglomerates.

It should be understood that the invention may be used in connection with any type of conglomerates, including inert granules of any form and dimensions.

A preferred embodiment of the machine of the invention is shown, by way of example only, in the accompanying drawings (FIGS. 1–8) in which:

FIG. 2 is a cross section of the machine through the extrusion chamber, outside of the charging hopper;

FIG. 3 is a vertical section through the mixing screw contained within the hopper;

FIG. 4 is the partial sectional view of a detail;

FIG. 5 is a partially sectioned perspective view of a multiple charging hopper;

Figure 1B:
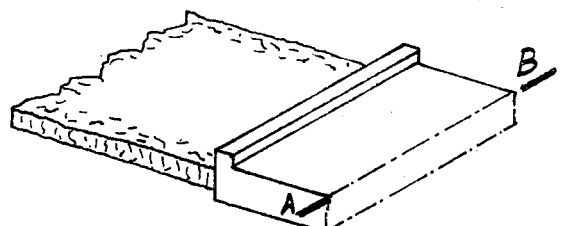
FIGS. 1a and 1b are perspective views: these two figures are meant to be connected along line A–B to form a whole.

The machine of the invention comprises a charging hopper 1 preferably shaped as a funnel having inserted therein a mixing and stirring device 2 actuated by an operating unit comprising a motor 3 and a speed reducer 4.

This charging hopper is adapted to receive the mixtures of various substances utilized to form the conglomerate, said substances having been preferably previously mixed.

After having been introduced in the charging hopper 1, said substances are mixed again and are kept stirred so as to facilitate their fall by gravity towards the bottom of the charging hopper 1.

Beneath said hopper there is provided a charging chamber 5 laterally defined by members 6 and 7 constituting an integral part of the machine of the invention.

Said members 6 and 7 form a mould and define laterally the extruding device, from the fore outlet chamber 14′ of which (FIGS. 6, 7) the conglomerate is discharged to form the output layer (see FIG. 1b).

The extruding device comprises furthermore a drawer-like slide element 8 subjected to a reciprocating motion which the element 8 receives from a piston 9 forming an integral part of a double action pneumatic or hydraulic cylinder.

This cylinder is connected to a hydraulic or pneumatic circuit comprising a compressor or a hydraulic unit and a fluid distributor (not shown).

It should be understood that the pneumatic or hydraulic members previously described and controlling the reciprocating motion of the slide member 8 may be replaced by link members or other mechanical means actuated by a suitable motor.

Figure 1A:
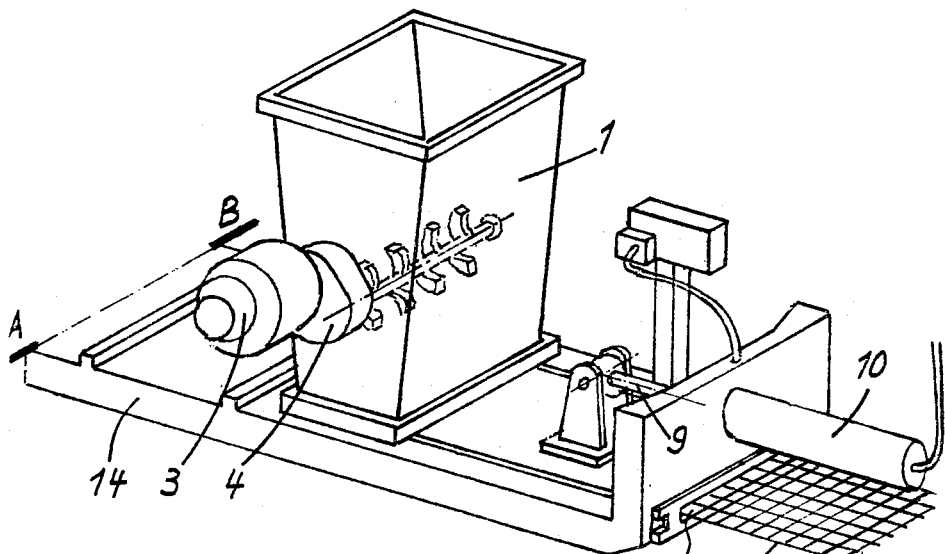

Said slide member 8 is provided with lateral walls 11 (FIG. 4), having a groove 12 that slidably receives the guide members 13 fixed to the outer frame 14 (FIG. 1).

In such a manner the slide member 8 reciprocates along the guides 13.

Figure 6:
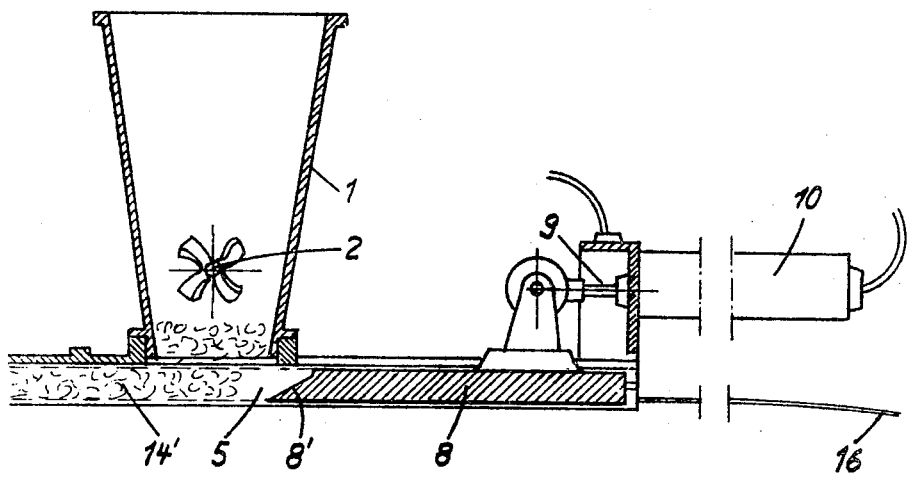
FIG. 6 is the longitudinal section of the machine having the extrusion chamber completely open to receive the material from the hopper.
Figure 7:
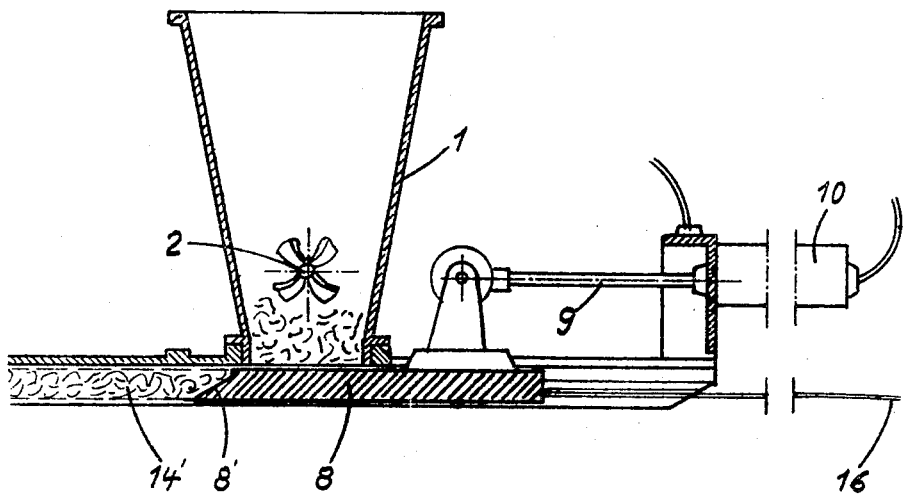
FIG. 7 is the same longitudinal section having the extrusion chamber completely closed to the material from the hopper.
Figure 8:
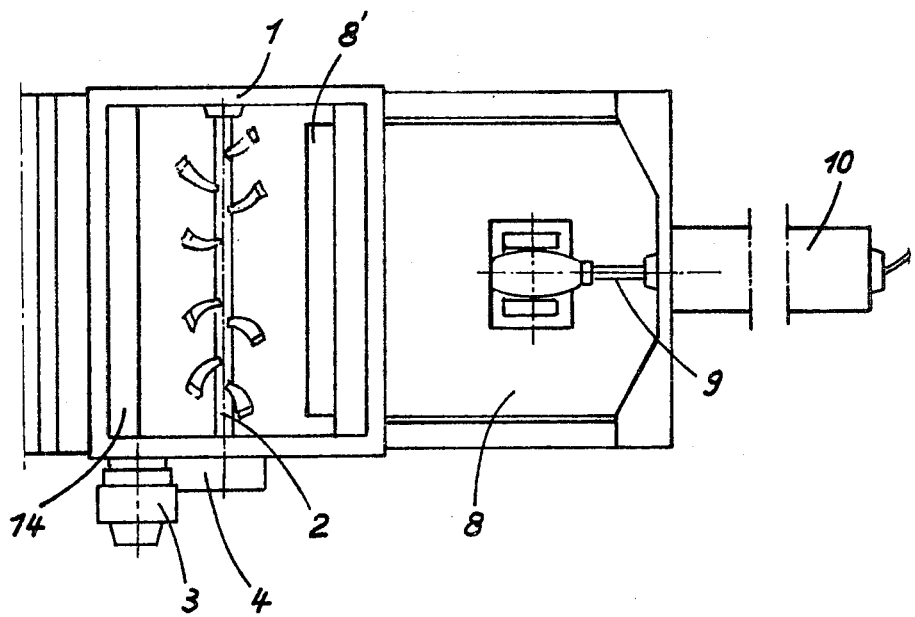
FIG. 8 is a plan view of the whole machine.

Said slide member 8 preferably has a downwardly forwardly inclined portion 8′ having the function of distributing and uniformly compressing the material in the pressing and shaping chamber 14′ (FIGS. 6 and 7).

In said chamber the cement conglomerate combined with the granules of inert material such as polystyrol, expanded clay, etc. is compressed, consequently shaped and finally extruded.

Said pressing chamber has furthermore automatically introduced thereinto the metallic reinforcement means 16 made to enter through a suitable slot 15 provided for this purpose in the body of the slide member 8 (FIGS. 1–4).

Said pressing chamber 14′ receives the material falling by gravity into the charging chamber 5 when the slide member 8 is in its retracted position (FIG. 6).

The charging hopper 1 may be subdivided in several portions (FIG. 5) by several separating walls 1', 1" etc. so that materials of different compositions and different chemical-physical characteristics may be charged therein.

In this case said material are made to fall in several sections 5', 5", etc., which the charging chamber 5 is subdivided into. The subdivision is facilitated by the provision of blades 8" applied to the slide member 8. In such a way it is possible to obtain panels, bars, profile elements and supporting elements or insulating members for construction purposes formed with different materials.

It should be understood that instead of the reinforcement grid 16, there could be introduced automatically into the slot 15 (FIG. 4) reinforcing rods of any shape, metallic profiled elements, connecting elements or reinforcement means of any other kind as long as they are suitable for use in extended panels.

It should be understood that the forming or extrusion chamber 14' may be shaped in any desired manner so as to obtain extruded elements of the most various forms or shapes.

Instead of forcing the material forwardly, the slide member 8 forces the machine itself rearwardly. Thus the machine slides to the right over its supporting surface as seen in FIGS. 6 and 7, while the compressed material tends to remain largely stationary relative to that supporting surface. Thus the degree of compression of material can be varied by varying the weight of the machine or by braking the rearward movement of the machine.

What is claimed is:

1. Apparatus for manufacturing construction elements in the form of plates and panels and the like, from material comprising cement conglomerate and granules of inert material, comprising a frame supporting a hopper, said frame comprising a horizontal top wall and a pair of vertical opposite side walls defining an extrusion chamber into which said hopper feeds said material, said frame being downwardly open between said side walls and the lower wall of said chamber comprising a supporting surface on which said material rests, a slide element horizontally reciprocable below said hopper into and out of said chamber to compress said material in said chamber, means on said frame guiding the reciprocating movement of said slide element and restraining said slide element against downward movement, means uniformly to distribute the material in the chamber and to compress the material in the chamber against material previously compressed in the chamber by the preceding stroke of said slide element comprising a downwardly forwardly inclined forward edge on said slide element, said machine being intermittently displaceable as a whole relative to said supporting surface under the reaction of pressure of the slide element against said material in said chamber, said pressure varying as the weight of said apparatus.

2. Apparatus as claimed in claim 1, said slide element having a horizontal slot extending therethrough for the introduction of reinforcing elements into said material.

3. Apparatus as claimed in claim 1, and a rotary mixing device in said hopper to mix said material in said hopper.

References Cited
UNITED STATES PATENTS

| 2,818,790 | 1/1958 | Canfield et al. | 25—118 W |
| 3,304,592 | 2/1967 | Fattirolli | 25—41 R |
| 3,530,552 | 9/1970 | Calder | 25—127 C X |

FOREIGN PATENTS

| 256,088 | 5/1964 | Australia | 25—41 R |

J. SPENCER OVERHOLSER, Primary Examiner

D. S. SAFRAN, Assistant Examiner

U.S. Cl. X.R.

425—200